United States Patent

[11] 3,575,280

| [72] | Inventor | Denny B. McClary |
| | | Box 469, Bonneville, Oreg. 97008 |
| [21] | Appl. No. | 784,143 |
| [22] | Filed | Dec. 16, 1968 |
| [45] | Patented | Apr. 20, 1971 |

[54] FISH EGG COUNTER
8 Claims, 5 Drawing Figs.

[52] U.S. Cl. .................................................. 198/40, 198/209
[51] Int. Cl. .................................................... B65g 43/00, B65g 29/00
[50] Field of Search .......................................... 198/33, 211; 134/25, 133, 134; 221/135; 133/8; 198/40, 209

[56] References Cited
UNITED STATES PATENTS
3,045,864  7/1962  Hurst ........................... 133/8

*Primary Examiner*—Richard E. Aegerter
*Attorney*—Kolisch & Hartwell

ABSTRACT: Apparatus for counting fish eggs including a container for holding eggs to be counted, and extending into the container a revolvable disc, including multiple apertures for collecting eggs with the disc revolving. A counter is provided for counting the number of revolutions of the disc. Eggs carried away in the apertures are discharged therefrom through an opening positioned and sized to communicate, at a given time, with a multiplicity of apertures. A water sprayer outside the container and opposite the opening sprays water onto the disc's surface. Such facilitates egg removal and by producing a film of lubricant on the surface of the disc reduces friction between such surface and eggs engaged thereby.

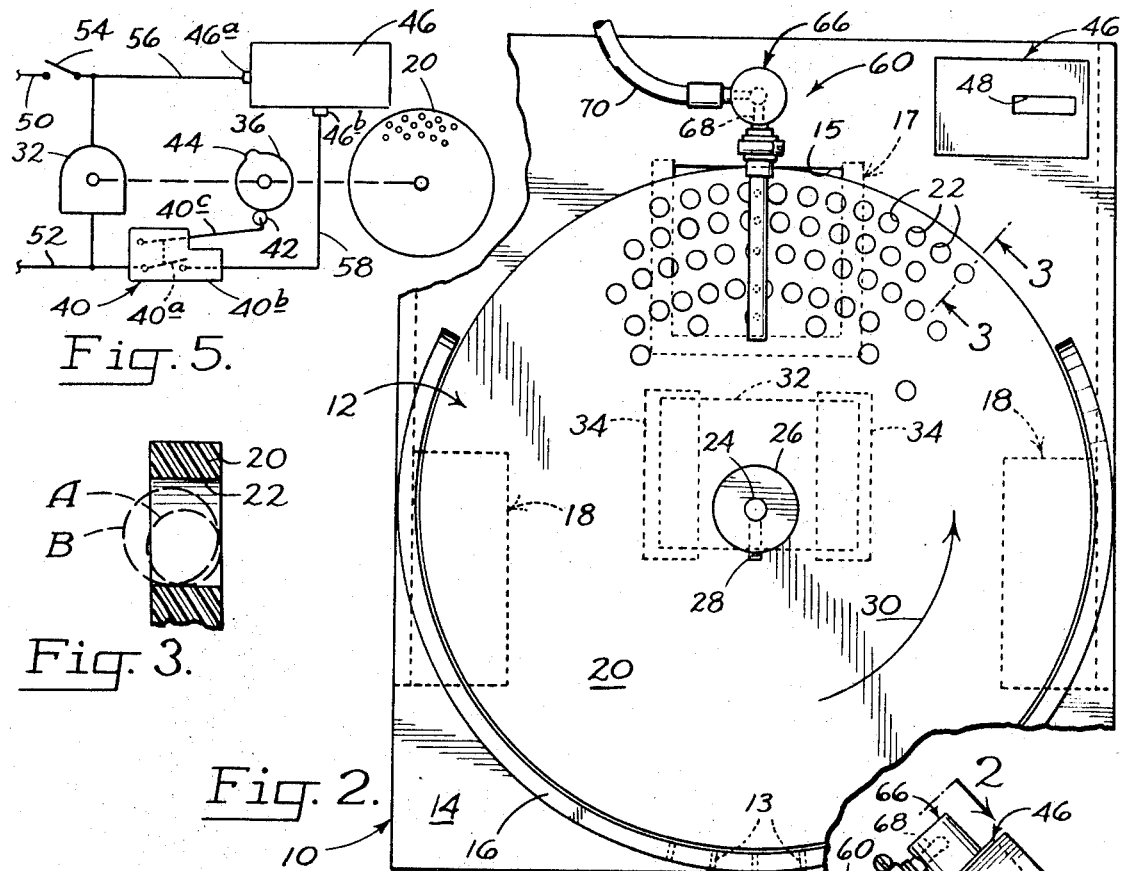
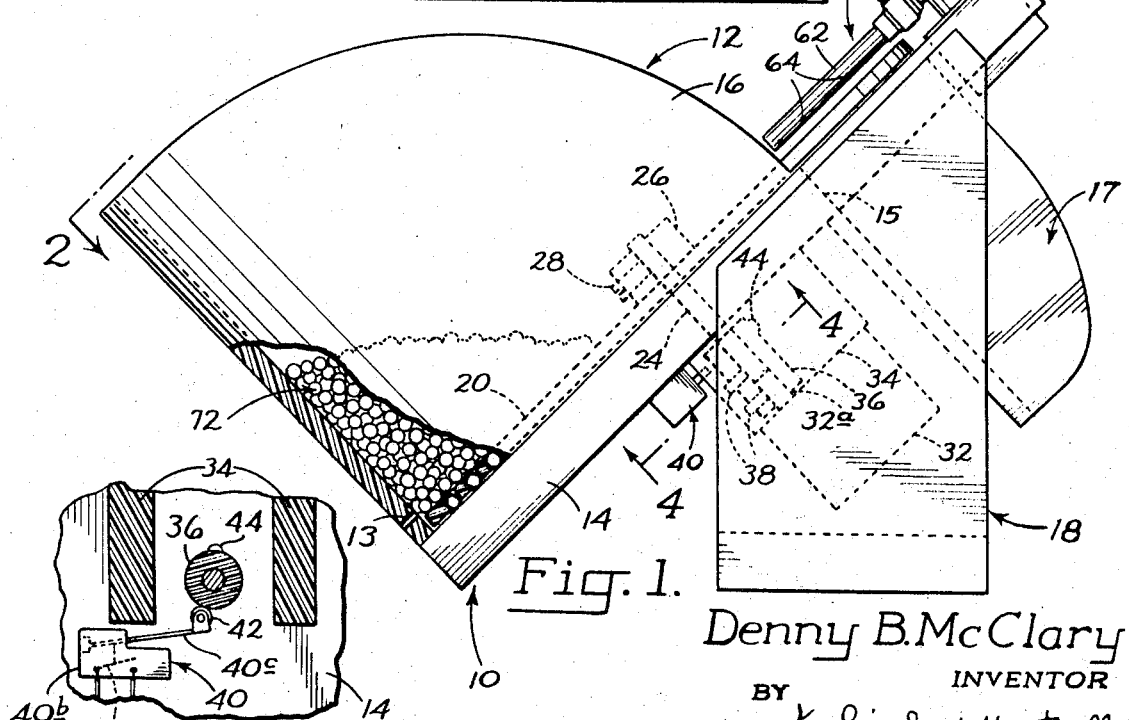

FISH EGG COUNTER

This invention pertains to apparatus for counting fish eggs.

There are today numerous fish hatcheries engaged, among other things, in collecting and distributing fish eggs. In such an operation, it is important for a number of reasons that a hatchery keep an accurate count of the number of eggs that it handles. Obviously, for the sake of economy, the counting process should require as little time and manpower as possible.

A problem in the past, however, has been that such counting has been relatively time consuming and costly. For example, typical known methods of counting fish eggs including weighing, or measuring the volumes of, relatively small batches of eggs, and from information gained thereby, and available data about the eggs, computing the number in the batch. Another method involves taking measured scoops of eggs and determining by the number of scoops taken the total of eggs involved. These methods, in addition to being slow, do not produce accurate egg counts. Further, where, as is often the case, the total number of eggs to be counted may be as high as 20 million eggs or so, a hatchery must utilize a relatively large number of personnel in order to accomplish counting in a reasonable period of time.

A general object of the present invention, therefore, is to provide novel apparatus for counting fish eggs which takes care of the above-mentioned difficulties in a practical and satisfactory manner.

More specifically, an object of the invention is to provide such apparatus which counts eggs quickly and accurately, and with minimal manual assistance.

According to a preferred embodiment, the invention contemplates a container for receiving and holding eggs to be counted, with eggs received in the container settling therein to form a mass adjacent the container's base. A rotatable disc extends into the container adjacent the base thereof, with a portion of the disc at all times underlying any mass of eggs in the container. The disc contains a certain number of apertures opening onto its opposite faces, each aperture being adapted to collect and remove one egg from the container during each revolution of the disc.

Further describing the preferred embodiment of the invention, a plate forming part of the container's base extends upwardly to an upper extension in which is formed a discharge opening adapted to receive eggs from the disc's apertures. The discharge opening is sized and positioned whereby, at a given time, it communicates with a multiplicity of the apertures distributed circumferentially of the disc. As a consequence, with the disc rotating, ample time is provided for an egg, even though slimy, to fall from an aperture into said opening without being crushed. Because discrete eggs don't actuate a counter, this type of organization is possible.

The disc is revolved under power, and means is provided for automatically counting the number of revolutions of the disc during a counting operation. From this number, and the number of apertures in the disc, the number of eggs removed from the hopper is easily determined.

If counting of the type suggested so far is to work successfully, certain characteristics of fish eggs must be taken into account in the design of counting apparatus. To begin with, a fish egg is a crushable article, and is easily damaged or destroyed if handled too severely. Further, fish eggs frequently are covered with a somewhat tacky film, and this makes them difficult to handle since they tend to stick to whatever they come in contact with.

To minimize the likelihood of egg damage, the invention proposes a construction which, during a counting operation, places a minimum amount of stress on an egg. Thus, the disc and container are constructed to take advantage of gravity acting on a mass of eggs in the container to effect the feeding of eggs from the container into the disc's apertures. To reduce further the likelihood of egg damage, and in addition to minimize the problem of tackiness, a water sprayer is provided outside the container, above the disc and opposite the discharge opening. During an egg counting operation, water sprays from the outlet and forms a film which lubricates the surface of the disc to reduce friction between the surface and eggs engaged thereby. With such lubrication, eggs in the container tend to fall easily into the apertures. Because the sprayer is located opposite the discharge opening, the water spray also is relied upon to urge eggs from the apertures into the opening.

These and other objects and advantages attained by the invention will become more fully apparent as the description which follows is read in conjunction with the accompanying drawings, wherein:

FIG. 1 is a side elevation of apparatus constructed according to the invention, with a portion of such apparatus broken away to illustrate certain details therein;

FIG. 2 is a fragmentary view, on the same scale as FIG. 1, taken along the line 2-2 in FIG. 1;

FIG. 3 is an enlarged fragmentary cross-sectional view of a rotatable disc in the apparatus, taken along the line 3-3 in FIG. 2;

FIG. 4 is a fragmentary view, on the same scale as FIG. 1, taken along the line 4-4 in FIG. 1; and FIG. 5 is a simplified schematic diagram illustrating electrical components used in the apparatus.

Turning now to the drawings, and referring first to FIGS. 1 and 2, indicated generally at 10 is apparatus as contemplated. The particular embodiment shown is constructed to count Chinook and Coho salmon eggs which have similar characteristics. Such eggs are generally spherical, and range in diameter from about nine thirty-seconds to about three-eighths of an inch. Referring for a moment to FIG. 3 which illustrates, on an enlarged scale, the relation between eggs of such sizes, A represents an egg having the smaller of the two diameters mentioned, and B represents an egg having the larger diameter.

Apparatus 10 comprises a container, or receiving station, indicated generally at 12 formed from an inclined planar plate 14 and a curved wall 16 joined to the top face of plate 14. As can be seen clearly in FIG. 2, the upper portion of plate 14 extends beyond the upper extremities of wall 16 in FIG. 2. When viewed as in FIG. 2, the wall curves along a substantially circular path encompassing an arc of about 240°. The upper edge of wall 16 curves in the manner illustrated in FIG. 1. The base of the wall is provided with drain holes 13, the function of which will become apparent later. Preferably, plate 14 and wall 16 are formed of a relatively smooth-surfaced material in order to minimize the likelihood of egg damage. The material known as plexiglas has been found to be suitable for this purpose.

Extending through the upper portion of plate 14, above the upper extremities of wall 16 in FIG. 2, is a rectangular opening 15. Opening 15 receives eggs discharged after a counting operation. Suitably mounted on the underface of plate 14 is a trough 17 which extends downwardly from opening 15. Trough 17 funnels eggs discharged through opening 15.

Plate 14 is supported in the inclined position shown by legs 18 joined to the plate's laterally opposite sides. The legs may be mounted on any suitable support.

Also forming part of the counting apparatus is a planar circular disc, or collector, 20. The outside diameter of disc 20 is just slightly less than the diameter of the arc defined by the inside face of wall 16 in FIG. 2. Disc 20 may be formed from the same type of material used for plate 14 and wall 16.

Distributed circumferentially about disc 20 are plural (preferably about 250) axially extending bores, or apertures, 22, only a few of which are shown in the drawings. Referring to FIGS. 2 and 3, each bore extends completely through, and opens onto axially opposite faces of, disc 20. Bores 22 may have substantially the same diameters. Each bore is large enough in diameter to accept an egg of the largest size expected to be counted, but not so large as to accept more than one of the smallest eggs expected to be counted. A satisfactory bore diameter for eggs coming within the size range indicated earlier is about seven-sixteenths of an inch. It will be noted that the cross-sectional area of a bore is considerably smaller than that of opening 15.

Disc 20 is disposed in a plane lying closely adjacent and substantially paralleling the plane of the top face of plate 14. Preferably, the space between the disc and plate is about one-sixteenth of an inch or less. The disc is supported for rotation about its axis on a shaft 24 which extends through suitable aligned bores in the disc and plate 14. The upper end of the shaft in FIG. 1 extends into a collar 26 which is joined to the top face of the disc. The shaft is secured to the collar by means of a screw 28. On rotation of the disc, bores 22 pass through container 12 and over opening 15. It should be noted that at any given time, opening 15 communicates with a multiplicity of the bores.

Disc 20 is rotated under power in the direction of arrow 30 in FIG. 2 by means of an electric motor 32. The motor is mounted on the lower face of plate 14 through laterally spaced mounts 34. The motor's output shaft 32a is drivingly connected to the lower end of shaft 24 in FIG. 1 through a cylindrical collar 36 and screws 38. Experiments made to date indicate a disc rotation speed of about 18 r.p.m. is optimum.

Also provided according to the invention is means for counting the number of revolutions of disc 20 during a counting operation. Referring particularly to FIGS. 1, 4 and 5, mounted on the underface of plate 14 adjacent collar 36 is an electrical switch mechanism 40. Mechanism 40 includes a normally open switch 40a (illustrated in dashed outline) contained within a housing 40b. Switch 40a is actuated by an arm 40c. The outer end of arm 40c carries a roller 42 which rides on the outside surface of collar 36. Mounted on the outside surface of the collar is a cam 44 which momentarily engages roller 42 and moves arm 40c once during each revolution of disc 20. On the cam and roller engaging, switch 40a closes momentarily.

Indicated generally at 46 is a conventional electromechanical counter suitably mounted on the top portion of plate 14. Counter 46 includes a pair of AC voltage input terminals 46a, 46b (shown in FIG. 5), and a window 48 (shown in FIG. 2) through which a number is presented representing the number of times that voltage is applied momentarily to the input terminals. Suitable means (not shown) is provided for setting the number presented in window 48 to zero.

Referring particularly to FIG. 5, at 50, 52 are AC supply conductors which may be connected to any suitable source of AC voltage. Conductor 50 is connected to terminal 46a in the counter through a main supply switch 54 and a conductor 56. Conductor 52 is connected to terminal 46b in the counter through switch 40a and a conductor 58. Motor 32 is connected between conductors 52, 56. With switch 54 closed, motor 32 operates. During each revolution of the motor, switch 40a closes momentarily as explained above, and applies AC voltage to terminals 46a, 46b.

Still describing apparatus 10, indicated generally at 60 in FIGS. 1 and 2 is means for lubricating the surface of disc 20 according to the invention. The lubricating means includes an elongated pipe, or sprayer, 62 having its lower end blocked off, and including downwardly facing ports, such as ports 64, spaced along its length. Pipe 62 is positioned closely adjacent the upper face of disc 20, and is disposed directly opposite opening 15. The upper end of pipe 62 is supported on plate 14 through mounting structure 66, and such structure includes a fluid passage 68 (shown in dashed outline) which communicates with the interior of the pipe. Water under pressure is supplied passage 68 and pipe 62 through a conduit 70 which is connected to structure 66.

Explaining now how the apparatus described may be used, eggs are placed in container 12 to fill the same substantially to the extent shown at 72 in FIG. 1. The eggs settle in the container to form a mass adjacent the base thereof, with the eggs supported by wall 16 and disc 20. The egg level in the container should be high enough to ensure that as the disc rotates, all bores 22 therein pass beneath the mass of eggs.

Water is supplied pipe 62 to produce a spray through ports 64 on the top surface of the disc. This spray wets and lubricates the disc's surface. Drain holes 13 in wall 16 carry away any water flowing to the base of container 12, and prevent the formation of a pool of standing water in the container. This is important, since such a pool of water would tend to immerse a portion of disc 20, and float eggs in the container, which action would impair collection of eggs in bores 22 as contemplated by the invention. Counter 46 is adjusted to a zero-count state.

To begin a counting operation, motor 32 is energized to rotate disc 20. Eggs collect by gravity in bores 22, and with the disc rotating, collected eggs are transported to opening 15 where they are discharged. During each revolution of the disc, each bore collects and removes one and only one egg. Counter 46 records and indicates the number of revolutions. At any given time, the number of disc revolutions indicated, multiplied by the number of bores 22 in the disc, gives accurately the number of eggs removed from the container.

As eggs continue to be removed from the container during the counting operation, more eggs must be added periodically to maintain a sufficiently high egg level for the reasons indicated above.

The water spray produced by ports 64 makes several important contributes during counting. By wetting and lubricating the surface of disc 20, the spray reduces friction between the disc and eggs. In so doing, it minimizes the likelihood of egg damage. In addition, it facilitates egg handling by reducing tackiness sometimes found on the surface of an egg. Further, with the spray directed onto the disc opposite opening 15, it assists in discharging eggs from bores 22.

With discharge opening 15 considerably larger than bores 22, and communicating at a given time with a multiplicity of such bores, eggs have an ample opportunity to fall from the bores through the opening.

A relatively large number of eggs can be counted over a short span of time. For example, with apparatus constructed as described herein, eggs may be counted at a rate in excess of a quarter of a million per hour.

It should be appreciated that while an embodiment of the invention has been described in conjunction with eggs of certain sizes, the invention can readily be adapted to count eggs of other sizes.

While a preferred embodiment of the invention has been described herein, it is appreciated that variations and modifications may be made without departing from the spirit of the invention. It is claimed and desired to secure by Letters Patent:

I claim:

1. A counter for counting fish eggs comprising:
    a receiving station for receiving and holding a mass of eggs to be counted, with such eggs settling by gravity to the base of the station,
    a revolvable collector disposed adjacent said receiving station including at all times a portion extending beneath and engaged by any mass of eggs at the base of the station, said collector being operable when revolved, and during each revolution thereof, to collect by gravity and carry away from the station a predetermined number of eggs,
    lubricating means spaced from said receiving station disposed adjacent said collector operable to lubricate the surface thereof by depositing a film of lubricant thereon to reduce friction between such surface and eggs engaged thereby,
    drive means operatively connected to said collector operable to revolve the same, and
    counting means operatively connected to said collector constructed to count the number of revolutions of the collector.

2. The counter of claim 1, wherein said collector includes multiple apertures distributed over the collector corresponding in number to the number of eggs carried away from said receiving station during a revolution of the collector, each aperture being constructed to carry away one egg from said receiving station during a revolution of the collector, and which further comprises means spaced from said station under said collector defining an opening beneath said collector adapted to receive eggs falling by gravity from said apertures, said opening at a given time communicating with a multiplicity of said apertures.

3. The counter of claim 2, wherein said opening has a dimension measured along a line following the path that an aperture travels on moving over the opening which is substantially greater than the dimension of the apertures similarly measured.

4. The counter of claim 2, wherein said lubricating means comprises a water sprayer constructed to spray water onto the collector's surface.

5. The counter of claim 4 which further comprises a drain adjacent the base of said receiving station constructed to drain water away from said collector at a rate whereby the collector's surface remains moist with, but nonimmersed in, water during operation of said sprayer.

6. The counter of claim 4, wherein said water sprayer is disposed above said collector opposite said opening.

7. In apparatus for counting fish eggs, the improvement comprising:
a receiving station for receiving and holding eggs to be counted, with eggs received in the station settling therein to form a mass adjacent the base of the station.
a movable collector including at all times a portion extending beneath and engaged by any mass of eggs in the station.
drive means operatively connected to to said collector for moving the same in an operating cycle wherein the collector collects by gravity and removes eggs from the station, and
film-producing lubricating means located outside said station and disposed adjacent said collector for lubricating the surface of the latter by preparing a film of lubricant thereon to reduce friction between such surface and eggs engaged thereby.

8. The apparatus of claim 7, wherein said lubricating means comprises a water sprayer adapted to spray water onto said collecotor's surface.